United States Patent [19]

Killar

[11] Patent Number: 4,690,451
[45] Date of Patent: Sep. 1, 1987

[54] CONVERTIBLE SUN VISOR

[76] Inventor: Thaddeus Killar, P.O. Box 1922, Carmel, Calif. 93921

[21] Appl. No.: 906,926

[22] Filed: Sep. 15, 1986

[51] Int. Cl.$^4$ .............................................. B60J 3/02
[52] U.S. Cl. ................................ 296/97 G; 296/97 K
[58] Field of Search ............... 296/97 G, 97 R, 97 H, 296/97 K; 160/DIG. 3

[56] References Cited

U.S. PATENT DOCUMENTS

| | | | |
|---|---|---|---|
| 2,134,414 | 10/1938 | Norcross | 296/97 G |
| 2,385,557 | 9/1945 | Ward | 296/97 G |
| 2,596,873 | 5/1952 | Solmes | 296/97 G |
| 2,667,222 | 1/1954 | McCarthy | 296/97 G |
| 2,685,336 | 8/1954 | Menighan | 296/97 G |

Primary Examiner—Robert R. Song
Attorney, Agent, or Firm—Mark C. Jacobs

[57] ABSTRACT

A convertible sun visor that can be mounted to a car body interior with an auxiliary mount means or which by the addition of accessory mounting clips can be secured to the original equipment sun visor.

The convertible sun visor, for the driver's slide (U.S.) includes an extendable portion that can move leftwardly to block sun between the normal visor disposition and the "A" post; and which extendable portion can extend rightwardly to block sun between the rear view mirror and the normal visor disposition.

The extendable portion can be adapted to work on a plurality of car models.

13 Claims, 11 Drawing Figures

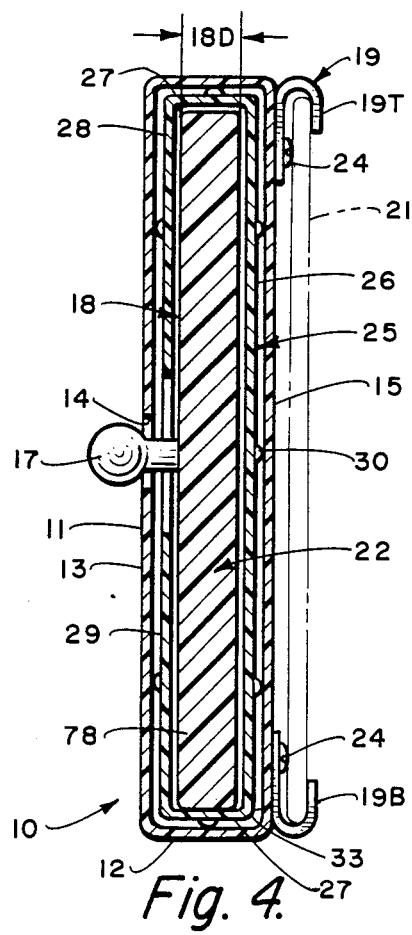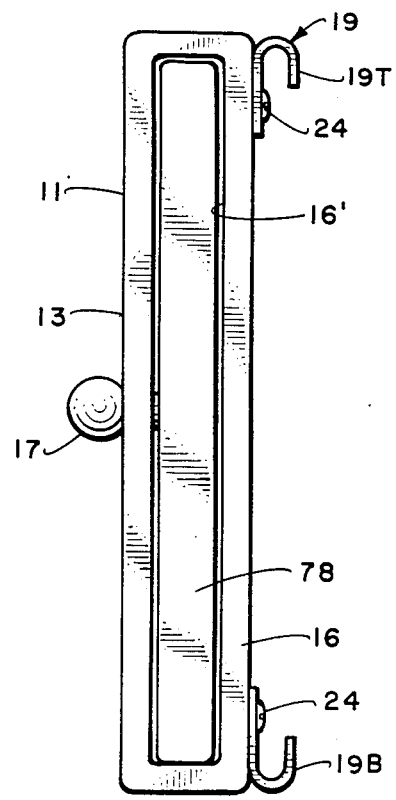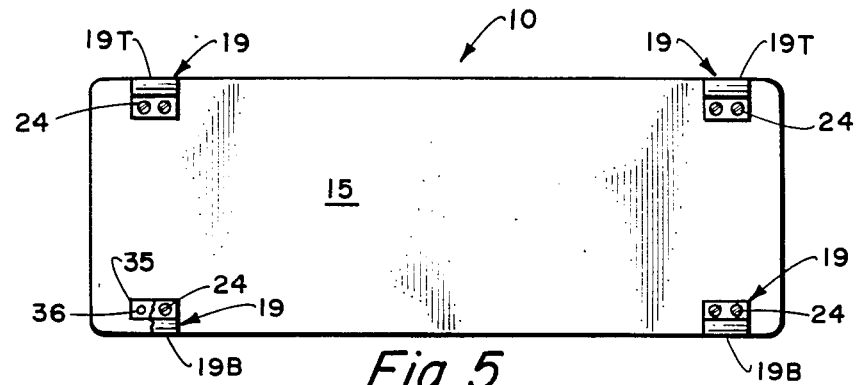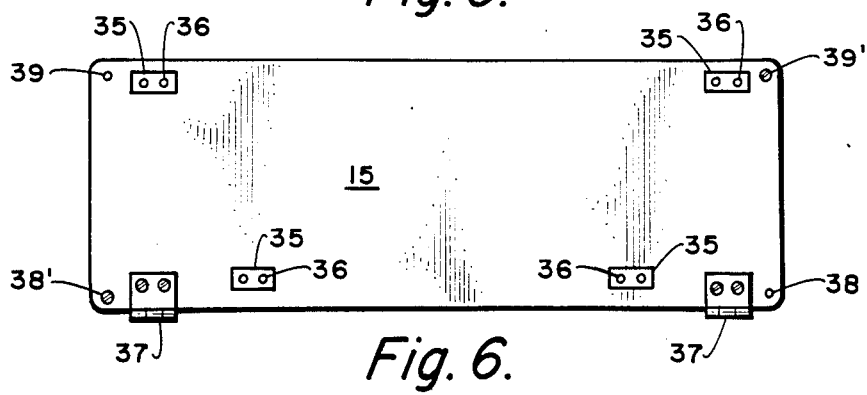

CONVERTIBLE SUN VISOR

FIELD OF INVENTION

The invention pertains to automotive accessories and the blockage of sun through the front windshield.

BACKGROUND OF THE INVENTION

Sun visors offered by automobile manufacturers only protect the driver from being dazzled by the sun, when the sun is directly in front of him or her. This area is called the central zone of visibility. If the sun is to the right side of the driver, the lowering of the visor on the passenger side does not always prevent the driver from being irritated by the sun. This zone between the end of the driver's visor and the rear view mirror is called the right zone of visibility. Indeed if the sun's rays come from the left of the driver into the car, the driver can turn the standard visor to the left, but since very few roads are straight as an arrow, as the driver turns while driving hither and yon, the angle of incidence of the light also changes as his directionality changes. Thus he is susceptible to dazzle from the now unprotected frontal area, which is designated the central zone of visibility.

There is therefore a need for a sun visor that protects against dazzle from all zones of visibility, without overly impeding the driver's vision of the highway and environs.

It is an object therefore to provide a housing in which an extendable portion is movably mounted, and which extendable portion is easily slidingly withdrawn to impede sun flow from either the left zone or the right zone of visibility.

It is another object to provide a sun visor housing that can be mounted in the headliner of the car with an auxiliary mounting means.

It is a yet further object to provide a sun visor that can extend rightwardly and not interfere with the rear view mirror.

It is yet another object to provide a sun visor housing that alternatively can be mounted to an original equipment visor with accessory mounting clips to protect against side sun dazzle.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings.

BRIEF DESCRIPTION OF THE FIGURES

FIG. 4 is a sectional view taken along the line 4—4 of FIG. 1.

FIG. 5 is a rear elevational view of the device of this invention.

FIG. 6 is a rear elevational view of the device of this invention with accessory mounting clips thereon for attachment to a pre-existing sun visor.

FIG. 7 is a right elevational view thereof.

SUMMARY OF THE INVENTION

A convertible sun visor that can be mounted by accessory clips to an existing sun visor or which when used in conjunction with an auxiliary mount means can be used as an original equipment visor. The visor features an extendable portion that can be directed rightwardly or leftwardly as may be desired.

DESCRIPTION OF THE PREFERRED EMBODIMENT

Figure 1:
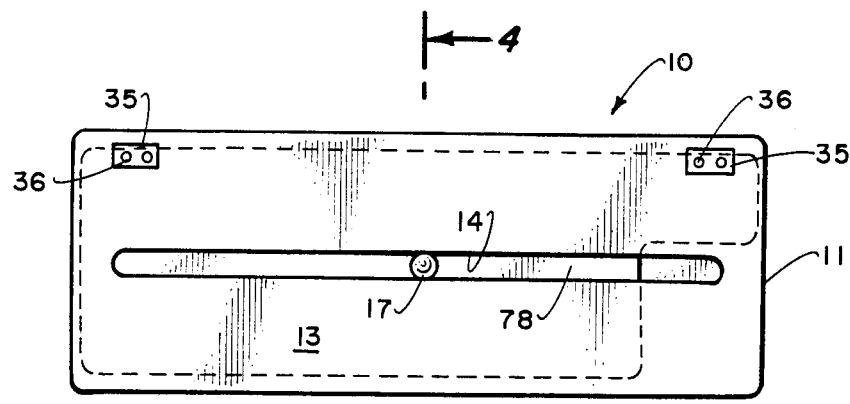
FIG. 1 is is a front elevational view of the device of this invention, with the extendable portion in a rest or first position.
Figure 2:
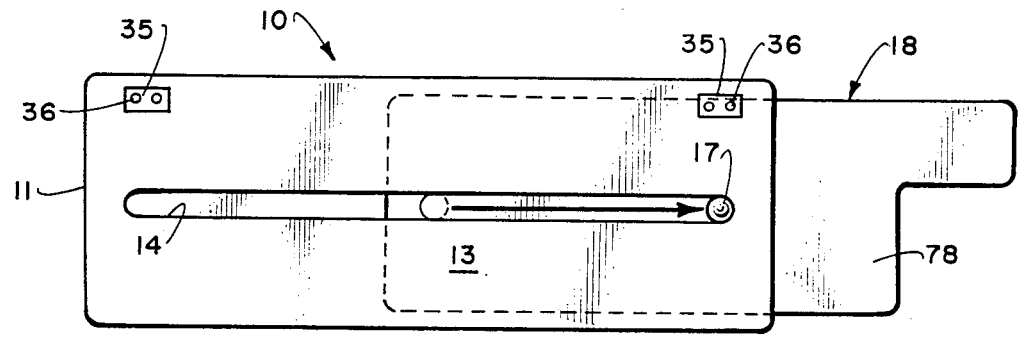
FIG. 2 is a front elevational view of the convertible sun visor of this invention with the extendable portion of the second or fully extended right position.
Figure 3:
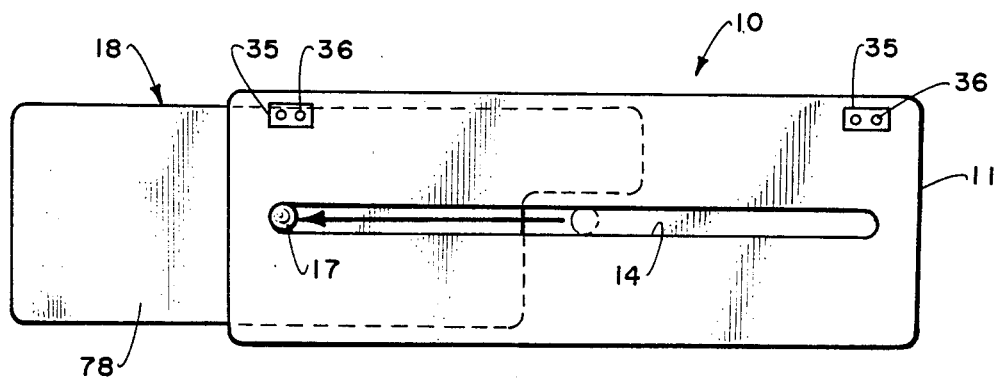
FIG. 3 is a front elevational view, similar to FIG. 2 with the extendable portion in a third or full left position.

As an introduction to the convertible sun visor of this invention, reference should be made to FIGS. 1-3, which show the general operation of the device, without any relationship to the mounting of the device. Thus device 10 is seen to have a housing 11, of which the front wall 13 is seen in these three figures. In the left and right upper corners are a recess 35, for the attachment of an auxiliary mount means or accessory mounting clips as will be discussed below.

An extandable portion 78, which is in reality element 18, a slider after suitable modification, —again to be discussed below—is seen to be disposed within the housing 11. The extendable portion has a forward extending knob suitably mounted thereon, such that portion 78 can be slidingly moved within the housing 11. The knob thereof, moving within the elongated horizontal slot 14.

In FIG. 1, the extendable portion 78 is not seen, as the knob 17 is disposed intermediate the side edges of the front wall 13 of the housing 11. Extendable portion 78 is thus disposed within the confines of the housing 11. Whereas in FIG. 2, it, 78, is extended the maximum rightwardly; and in FIG. 3 it is extended maximum leftwardly.

Turning now to FIG. 4, which is a sectional view taken along line 4—4 of FIG. 1. Thus one sees device 10 comprised of a housing 11, having spaced parallel top and bottom walls 12, a front wall 13 having an elongated slot therein 14, best seen in FIGS. 1-3. The spaced rear wall 15 is perpendicular to the front wall 13. While so shown in the Figure for ease of understanding, it is also to be seen that the top and bottom walls can be chamfered such that the appearance of a gentle curved top and bottom wall are found in the device.

Frame 25, which constitutes a track upon which the slider 18 slides, includes a rear vertical wall 26, and spaced parallel top and bottom walls. Depending down from the leading edge of top wall 27 is front wall 28; and depending upwardly from the leading edge of bottom wall 27 is front wall 29. The walls 27 are of equal length and are sized to be slightly larger than the thickness of the slider 18. The two front walls are aligned vertically but spaced from each other, the distance constituting slot 14.

The slider 18 is generally rectangular and of a depth 18D as shown by the arrow so labeled. Disposed at about the center of slider 18 and extending forwardly therefrom at a location corresponding to the spacing between the front walls 28, 29 of the frame is forwardly extending knob 17. Knob 17 may be square, round or any convenient configuration.

Figure 8:
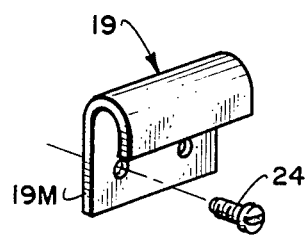
FIG. 8 is a perspective view of the accessory mounting clip shown attached to the rear of the device in FIG. 6.

The accessory mounting clips 19 previously referred to are mounted on the exterior side of the wall 15 of the housing 11 and fit onto OEM visor 21. They are designated 19T and 19B respectively for top and bottom. One of these spring steel clips is shown in perspective in FIG. 8 as is one of its mounting screws 24. Screw 24 is secured in bore 36 of the recess 35, sized to receive 19M the bracket segment of spring clip 19. The bracket segment and the remainder of the the accessory clip can be one integrated unit or two separate pieces as may be convenient for manufacturing.

Reference is now made to FIG. 5, the rear view. Here rear wall 15 is seen to include the accessory mounting clips 19B and 19T as aforementioned. These are secured to back wall 15 within the recesses 35 at both the upper and lower locations as shown in FIG. 5. Screws 24 are used to secure the clips to bores 36 in the recesses 35. In FIG. 6, a view similar to FIG. 5, only four corner recesses 35 are seen with their appropriate bores 36 for mounting screw 24.

Shown in this view at the bottom thereof, for easy of understanding are both of, a pair of spaced hinges 37 and one assembly bore 38 (right side), the left such bore being shown occupied by an appropriate self taping screw 38'. Also seen are the assembly bores at the top edge of the rear wall 15, designated 39 and their assembly screws 39'.

Assembly would require the 4 screws aforesaid or the top assembly screw only if hinges were employed to join front wall 13 to rear wall 15 at the bottom thereof. These screws would as is done conventionally, engage bores or threaded bores in bosses not seen for easy of illustration, but which would be located on the inside surface of the front wall 13. The bores thereof would align with bores 38, 39. Many rectangular two piece items are assembled in such fashion. As an alternative, and recognized to be within the skill of the art, one could employ an adhesive band to join the front and rear walls 13, 15 together, though access to within the cavity to frame 25 would be impossible.

Figure 9:
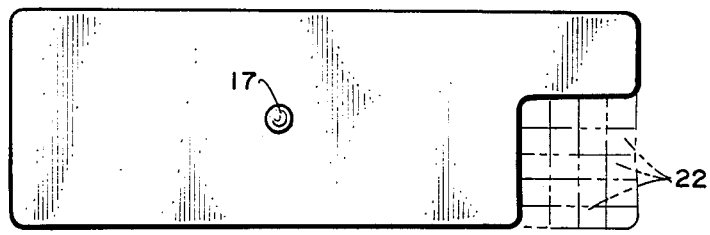
FIG. 9 is an elevational view of the slider, before its adaptation to become the extendable portion of the invention for a specific vehicle.
Figure 10:
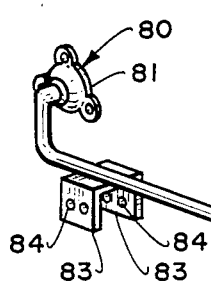
FIG. 10 is a perspective view of the auxiliary mount means employable with the invention to use it as an original equipment sun visor.

In FIG. 7, which is a right side elevational view, the left side view, being a mirror image thereof, the slider has been designated 78, not 18. This is because as seen in FIG. 9, the slider is designated as slider 18, until such time as the adapter zone 23 has been adapted to the particular car where the device will be used. After a suitable number of the prescored adapter areas 22 have been removed, the slider 18 is designated the extendable portion 78, since it can now be used as designed, per FIG. 2. Note that for OEM equipment it may be preferable to not to prescore the extendable portion. Each of the adapter areas 22 may vary from about $\frac{1}{4}$" to 1" in each direction. The scoring may be actual or merely a marking for cutting as may be desired, and of course dependent upon the material employed for slider 18. Typically slider 18 may be made of heavy gauge cardstock, plastic, sheet metal or any of the above, with a fabric overlay. The number of little areas 22 to be removed, will vary with the size and relative location of the rear view mirror viz a viz the placement of the sun visor 10, regardless of how 10 is mounted, be it accessory clips or auxiliary mount means. It is within the skill of the art, to properly locate device 10, and to extend the slider 18, followed by the removal of the correct number of adapter areas 22 so as to permit the movement rightwardly of the extendable portion 78 to a position adjacent the mirror. Removal may be by shears, saw or other convenient tool.

In this view the sidewall 16 of the housing 11 is seen. Each sidewall 16 includes a generally rectangular, vertically elongated cutout portion 16' sized horizontally and vertically to contain the frame 25 therein, yet permit the slider 18 to emerge. In order to avoid the necessity of close tolerances, a glue dab, 30 —or equivalent means—seen in FIG. 4 may be employed at suitable locations, to maintain the frame in place relative to the housing's rear wall.

Movement leftwardly is limited only by the location of the "A" post, 50. See FIG. 11.

Figure 11:
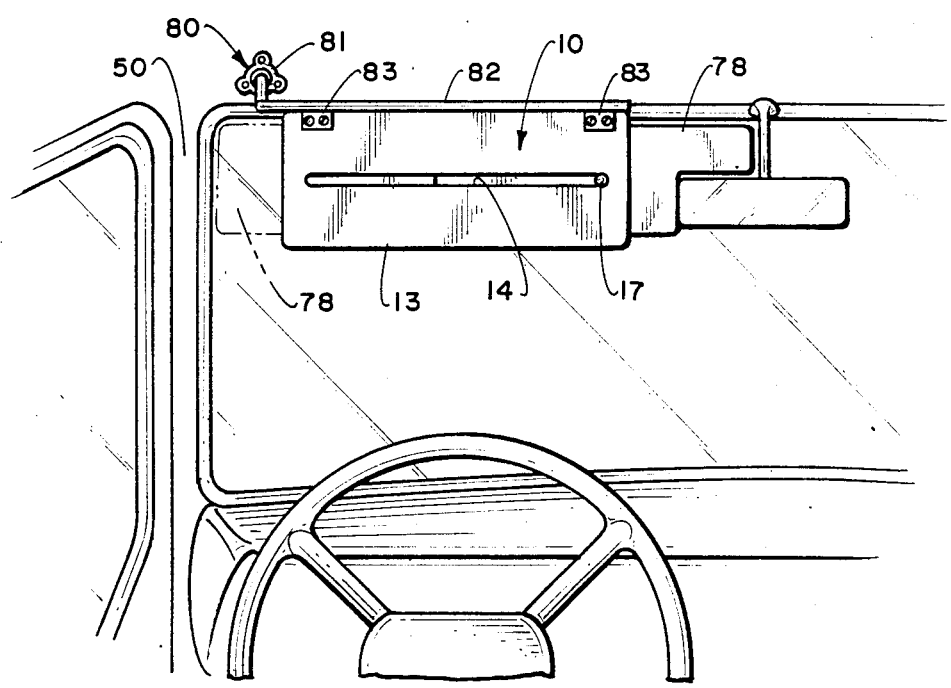
FIG. 11 is perspective view of the interior of an automobile showing the device of this invention in use as an original equipment sun visor, with the extendable portion extended rightwardly to a position adjacent the rear view mirror.

Device 10 is employed as an original equipment unit when utilized in conjunction with auxiliary mount means 80. This means 80 includes a horizontal bar 82 from which depend a quartet of mount flanges 83 having bores 84 therein. The placement of the flanges is predetermined to correspond to the recesses 35 of device 10 and the bores 84 are aligned with bores 36 to facilitate attachment. See FIG. 6. A conventional pivoting arm as used in the automotive industry depends upwardly from bar 82. This arm 81 is to be mounted conventionally above the windshield of the vehicle as shown in FIG. 11.

No detail has been spent on the materials to be used in the construction of device 10. That is because standard materials such as plastic, metal, heavy duty cardstock, and the like either fabric covered or flock coated may be employed for all components, of the housing, frame and slider. Auxiliary mount means 80 is preferably of chrome covered steel, or vacuum metalized plastic.

In recapitulation it is seen that I have provided a convertible sun visor that can be made from standard materials and adapted to a great many automobiles. In this device a slider comprising a generally rectangular planar member movably disposed on a frame can be maneuvered laterally, in either direciton as may be desired.

While I have shown mounting recesses on the front and rear walls of the housing and at the top and bottom thereof, it is readily apparent that only two accessory clips are necessary, even though four are preferable to prevent slippage. It is also readily apparent that a different auxiliary mount means may only have flanges for attachment on the rear wall or on the front wall of the housing of device 10.

While the drawing herein all show the adapter zone in the lower right corner, because the device is intended primarily for drivers, and applicant being from the U.S.A. has shown the driver as the left seat. Obviously, the device can be used by passengers of U.S. cars and by European drivers and passengers as well.

Since certain changes may be made in the above product without departing from the scope of the invention herein involved, it is intended that all matter contained in the above description and shown in the accompanying drawings shall be interpreted as illustrative and not in a limiting sense.

What is claimed is:

1. A convertible sun visor for an automobile adapted to be used as original equipment, when employed with an auxiliary mount means, and also adapted to be used an accessory sun visor by mounting thereof upon a preexistent sun visor, which comprises:

A. a generally rectangular housing having a rear wall, and a spaced therefrom front wall, said front wall having a longitudinal slot therein, and a pair of spaced connecting side walls, each of which has an vertically elongated cutout portion therein;

said housing being adapted to receive one of, auxiliary mount means for mounting said device on a preexistent sun visor or means for mounting as an original equipment sun visor;

B. a frame disposed within said housing, said frame having a rear wall, spaced top and bottom walls and a front wall, having a longitudinal slot therein, said frame being open at each end, and;

C. an elongated laterally adjustable light diminishing slider slidably mounted for longitudinal adjustment, both leftwardly and rightwardly, in said frame and sized to extend when extended through the side walls of said housing, said slider being adaptable to not impact upon the rear view mirror of a plurality of vehicles when in the rightwardly position;

D. a knob connected to said slider, said knob extending forwardly through the longitudinal slots in said housing and said frame.

2. The device of claim 1 wherein the adaptation for receiving the means for mounting is at least one pair of horizontally spaced mounting recesses on at least one of said front and said rear walls of said housing.

3. The device of claim 1 wherein the adaptation for receiving the means for mounting is a pair of horizontally spaced mounting recesses adjacent the top edge of said front and said rear walls of said housing.

4. The device of claim 1 wherein the adaptation for receiving the means for mounting is two pair of horizontally spaced mounting recesses adjacent the top edge of said front and said rear walls of said housing and adjacent the bottom edge of said front and rear wall.

5. The device of claim 2 wherein the means for mounting in the recesses are accessory spring clips.

6. The device of claim 2 wherein the means for mounting is an auxiliary mount means comprising a base adapted to be secured to said car body and a pivoting arm having mounting flanges thereon for attachment to said housing.

7. The device of claim 2 wherein the laterally extendable slider is generally rectangular and includes an adapter zone comprised of a plurality of adapter areas at the lower right corner thereof, which areas are readily removable from said slider.

8. The device of claim 7 wherein the laterally extendable slider comprises an extendable portion formed from a generally rectangular planar member from which a portion of the lower corner has been removed.

9. The device of claim 7 wherein each of the adapter areas is a square of about $\frac{1}{2}$ to 1" in each direction, prescored on a planar member slider.

10. The device of claim 1 wherein the front wall of the housing is hingedly attached to the rear wall of the housing.

11. The device of claim 8 wherein the portion of the corner removed is relative to the location of the rear view mirror and to the sun visor of the car.

12. The device of claim 9 wherein the portion removed is from the driver's side and is the lower right corner of the slider.

13. The device of claim 1 wherein the housing is fabric covered metal or plastic.

* * * * *